United States Patent
Hashemzadeh et al.

(10) Patent No.: US 9,522,986 B2
(45) Date of Patent: Dec. 20, 2016

(54) MINERAL CONSTRUCTION MATERIAL BASED ON POLYVINYL-ALCOHOL-STABILIZED POLYMERISATES

(71) Applicant: Wacker Chemie AG, Munich (DE)

(72) Inventors: Abdulmajid Hashemzadeh, Burghausen (DE); Jessica Seidel, Zangberg (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 14/651,620

(22) PCT Filed: Dec. 16, 2013

(86) PCT No.: PCT/EP2013/076704
§ 371 (c)(1),
(2) Date: Jun. 11, 2015

(87) PCT Pub. No.: WO2014/095721
PCT Pub. Date: Jun. 26, 2014

(65) Prior Publication Data
US 2015/0307684 A1    Oct. 29, 2015

(30) Foreign Application Priority Data

Dec. 18, 2012 (DE) .......... 10 2012 223 614

(51) Int. Cl.
| | | |
|---|---|---|
| *C08K 3/36* | (2006.01) | |
| *C04B 28/04* | (2006.01) | |
| *C08F 16/06* | (2006.01) | |
| *C04B 40/00* | (2006.01) | |
| *C08F 216/06* | (2006.01) | |
| *C04B 103/00* | (2006.01) | |
| *C04B 111/00* | (2006.01) | |
| *C04B 111/72* | (2006.01) | |

(52) U.S. Cl.
CPC ............... *C08K 3/36* (2013.01); *C04B 28/04* (2013.01); *C04B 40/0039* (2013.01); *C08F 16/06* (2013.01); *C08F 216/06* (2013.01); *C04B 2103/0057* (2013.01); *C04B 2111/00517* (2013.01); *C04B 2111/00637* (2013.01); *C04B 2111/00672* (2013.01); *C04B 2111/72* (2013.01); *Y02W 30/97* (2015.05)

(58) Field of Classification Search
CPC ....... C08K 3/36; C04B 28/04; C04B 40/0039; C04B 2103/0057; C04B 2111/00517; C04B 2111/00637; C04B 2111/00672; C04B 2111/72; C08F 16/06; C08F 216/06
USPC ...... 524/555, 3–6, 423–426; 526/317.1, 330, 526/348.1
See application file for complete search history.

(56) References Cited

U.S. PATENT DOCUMENTS

| | | | |
|---|---|---|---|
| 5,567,750 A * | 10/1996 | Schulze | ................. C04B 24/26 524/3 |
| 5,874,524 A | 2/1999 | Pakusch et al. | |
| 6,559,236 B1 | 5/2003 | Willimann et al. | |
| 2006/0189772 A1* | 8/2006 | Scheibel | ............... C08F 216/06 526/317.1 |
| 2006/0264572 A1 | 11/2006 | Hashemzadeh et al. | |
| 2009/0030168 A1 | 1/2009 | Schorm et al. | |

FOREIGN PATENT DOCUMENTS

| | | |
|---|---|---|
| EP | 0 632 096 A1 | 1/1995 |
| EP | 0 770 640 A2 | 5/1997 |
| EP | 1 984 428 B1 | 7/2009 |
| JP | 57-121671 A2 | 7/1982 |
| JP | 58-185640 A2 | 10/1983 |
| JP | 59-030827 A2 | 2/1984 |
| WO | 00/05275 A1 | 2/2000 |
| WO | 00/05283 A1 | 2/2000 |

OTHER PUBLICATIONS

Fox T. G. Bull. Am. Physics Soc 1, 3, p. 123 (1956).
Polymer Handbook 2nd Edition, J. Wiley & Sons, New York (1975).
International Search Report, International Application No. PCT/EP2013/076704, Mar. 5, 2014, 2 pages.

* cited by examiner

*Primary Examiner* — Michael M Bernshteyn
(74) *Attorney, Agent, or Firm* — Brooks Kushman P.C.

(57) ABSTRACT

Polyvinyl alcohol-stabilized polymers in mineral building material compositions, contain one or more polyvinyl alcohols comprising one or more tertiary amine groups or one or more quaternary ammonium groups.

9 Claims, No Drawings

MINERAL CONSTRUCTION MATERIAL BASED ON POLYVINYL-ALCOHOL-STABILIZED POLYMERISATES

CROSS-REFERENCE TO RELATED APPLICATIONS

This application is the U.S. National Phase of PCT Appln. No. PCT/EP2013/076704 filed Dec. 16, 2013, which claims priority to German application DE 10 2012 223 614.7 filed Dec. 18, 2012.

BACKGROUND OF THE INVENTION

1. Field of the Invention

The present invention relates to the use of polyvinyl alcohol-stabilized polymers in mineral building material compositions, more particular in tile adhesives, grouts or spray-applied concrete.

2. Description of the Related Art

Polyvinyl alcohol-stabilized polymers find widespread use in mineral building material compositions, such as coating materials or adhesive-bonding materials, to improve the performance properties of such compositions. The polymers are based in general on ethylenically unsaturated monomers, such as on vinyl esters and ethylene, for example. Mineral building material compositions mixed up with water are required generally to remain stable for a certain time and ought not to exhibit any substantial change in their processing consistency (cement stability or stability of viscosity). Otherwise the user is unable to use the building material compositions to produce constructions having the required performance properties, such as adhesion, imperviosity to water, or mechanical properties, or the user would have to continually produce new building material compositions within short timespans, an unacceptable burden in practice. The use of common polyvinyl alcohols, however, based essentially on vinyl alcohol units and also vinyl ester units and optionally further comonomer units, such as ethylene units, may impact adversely on the processing qualities of polymer-enhanced mineral building material compositions and may lead, for example, to high trowel adhesion or high viscosity. Problems of these kinds occur to an increased extent when mineral building material compositions have relatively high polymer contents. In order to improve the processing properties, EP1984428 advises using protective colloids based on cationic monomers and optionally nonionic comonomers. In practice the cationic monomers frequently contain chloride counterions. When used in mineral building material compositions, however, cationic protective colloid-stabilized systems of these kinds may release odor-intensive substances, which is deprecated, and may also lead to a significant introduction of corrosive substances, such as chlorides. EP0770640 teaches the addition of polymer compositions based on cationic polyelectrolytes and also anonic polyelectrolytes. Such polymers are based on expensive monomers and introduce large amounts of possibly corrosive counterions, such as chlorides, owing to the large number of ionic groups therein. EP0632096 discloses nonionic polyvinyl alcohols which contain units of allylamine, and which when used as a protectine colloid for polymers in mineral building material compositions, accordingly, do not lead to any introduction of corrosive substances, such as chloride. In the context of use in mineral building material compositions, however, there is still potential for improvement in terms of the processing properties, such as the open time, as it is called.

Against this background, the object was that of providing polyvinyl alcohol-stabilized polymers which when used in mineral building material compositions lead to a further improvement in processing properties, such as cement stability and/or stability of viscosity, or else lead, in particular, to a prolongation of the open time, and as far as possible release less odor-intensive substances. The polyvinyl alcohols ought also to be inexpensive and to be obtainable according to establisped processes that are not costly or inconvenient, moreover.

SUMMARY OF THE INVENTION

These and other objects have been achieved, surprisingly, by stabilizing the polymers with polyvinyl alcohols comprising monomer units with tertiary amine groups or quaternary ammonium groups.

DETAILED DESCRIPTION OF THE PREFERRED EMBODIMENTS

Protective colloids containing amine groups or ammonium groups are known per se and have found use in a variety of fields of application. For instance, WO-A 00/05275 describes a process wherein cationic monomers are polymerized in an aqueous medium, and further monomers are polymerized in the presence of the polymer formed in situ in the initial polymerization. The polymer dispersion thus obtained is then spray-dried in the presence of polyvinyl alcohol. A process analogous to this is described in WO-A 00/05283, where the process is controlled such that copolymer particles with heterogeneous morphology are formed. Processes of these kinds, however, are costly and inconvenient. JP S58-185640A and JP S59-30827 describe polymers stabilized with cationic polyvinyl alcohols, and consider the possible applications of such polymers in coating materials, adhesive-bonding materials, paints, or else, generally, in construction materials, but say nothing about processing properties of mineral building material compositions. JP S57-121671 recommends corresponding polyvinyl alcohol-stabilized polymers as sizing agents for fibers.

The invention provides for the use of polyvinyl alcohol-stabilized polymers in mineral building material compositions, characterized in that one or more polyvinyl alcohols of the polyvinyl alcohol-stabilized polymers comprise one or more tertiary amine groups or one or more quaternary ammonium groups (Nitrogen-functionalized polyvinyl alcohols).

The terms "tertiary amine group" and "quaternary ammonium group" are well known to the skilled person. In tertiary amine groups, the nitrogen atom is substituted by three carbon radicals. In the case of quaternary ammonium groups, the nitrogen atom is substituted by four carbon radicals. The quaternary ammonium groups may have, for example, sulfates, hydroxides, carboxylates, or more preferably halides, more particularly chloride, as counterions.

In the nitrogen-functionalized polyvinyl alcohols, the tertiary amine group is generally bonded via the nitrogen atom of the tertiary amine group to a carbon atom of the polyvinyl alcohol, and also carries two radicals which are bonded via a carbon atom to the nitrogen atom of the tertiary amine group. In the nitrogen-functionalized polyvinyl alcohols, a quaternary ammonium group is generally bonded via the nitrogen atom of the quaternary ammonium group to a carbon atom of the polyvinyl alcohol, and also carries three radicals which are bonded via a carbon atom to the nitrogen atom of the quaternary ammonium group. The radicals may for example contain 1 to 20 C atoms and may optionally contain one or more functional groups.

The nitrogen-functionalized polyvinyl alcohols are preferably obtainable by copolymerization of one or more ethylenically unsaturated monomers which comprise one or more tertiary amine groups or one or more quaternary ammonium groups with one or more vinyl esters of unbranched or branched carboxylic acids having 1 to 15 C atoms, and hydrolysis of the resulting vinyl ester copolymers to give polyvinyl alcohols functionalized with nitrogen in accordance with the invention.

As ethyenically unsaturated groups, the monomers which comprise one or more tertiary amine groups or one or more quaternary ammonium groups carry preferably one or more olefin groups, such as allyl or vinyl, acryloyl or methacryloyl groups. Examples of ethyenically unsaturated monomers which comprise one or more tertiary amine groups or one or more quaternary ammonium groups are allylalkylammonium halides, (meth)acryloyloxyalkylammonium halides, (meth)acrylamidoalkylammonium halides, aminoalkyl (meth)acrylate, and aminoalkyl(meth)acrylamide, in which the alkyl radicals may contain 1 to 20 C atoms, more particularly 1 to 4 C atoms, and also nitrogen atom-containing, optionally substituted heteroaromatics which carry vinyl groups. Examples of heteroaromatics are imidazole or pyridine.

Ethyenically unsaturated monomers which comprise tertiary amine groups are preferably selected from the group encompassing 2-dimethylaminoethylmethacrylate and 3-dimethylaminopropylmethacrylamide (DMAEMA or DMAPMA in the case of species protonated at pH≤5) and also N-(1,1-dimethyl-3-dimethylaminopropyl)acrylamide, N-(1,1-dimethyl-3-dimethylaminobutyl)acrylamide, N-(1-methyl-1,3-diphenyl-3-diethyl-aminopropyl)methacrylamide, 1-vinylimidazole, 1-vinyl-2-methylimidazole, 1-vinyl-2-ethylimidazole, 1-vinyl-2-phenylimidazole, 1-vinyl-2,3-dimethylimidazole, and 1-vinyl-2,4,5-trimethylimidazole.

Preferred ethylenically unsaturated monomers which comprise quaternary ammonium groups are selected from the group encompassing diallyldiethylammonium chloride (DADEAC), (3-methacryloyloxy)propyltrimethylammonium chloride (MPTAC), (3-methacryloyloxy)ethyltrimethylammonium chloride (METAC), (3-methacrylamido)propyltrimethylammonium chloride (MAPTAC), trimethyl-3-(1-acrylamido-1,1-dimethylpropyl)ammonium chloride, trimethyl-3-(1-acrylamido-1,1-dimethylbutyl)ammonium chloride, dimethylacrylamidopropyl-4-trimethylammoniumbuten-2-ylammonium chloride, (2-acrylamidomethoxy)ethyltrimethylammonium chloride, and especially diallyldimethylammonium chloride (DADMAC).

Particularly preferred here are diallyldimethylammonium chloride (DADMAC), diallyldiethylammonium chloride (DADEAC), (3-methacryloyloxy)propyltrimethylammonium chloride (MPTAC), (3-methacryloxy)ethyltrimethylammonium chloride (METAC), and (3-methacrylamido)propyltrimethylammonium chloride (MAPTAC).

Vinyl esters are vinyl esters of unbranched or branched carboxylic acids having 1 to 15 C atoms. Preferred vinyl esters are vinyl acetate, vinyl propionate, isopropenyl acetate, vinyl butyrate, vinyl-2-ethylhexanoate, vinyl laurate, 1-methylvinyl acetate, vinyl pivalate, and vinyl esters of α-branched monocarboxylic acids having 5 to 15 C atoms, as for example VeoVa9R or VeoVa10R (trade names of the company Resolutions). Particularly preferred are isopropenyl acetate, and especially vinyl acetate.

In addition it is possible optionally for one or more comonomers to be copolymerized from the group encompassing methacrylic esters and acrylic esters of alcohols having 1 to 15 C atoms, olefins, dienes, vinylaromatics, and vinyl halides.

Examples of suitable comonomers from the group of the esters of acrylic acid or methacrylic acid are esters of unbranched or branched alcohols having 1 to 15 C atoms. Preferred methacrylic esters or acrylic esters are methyl acrylate, methyl methacrylate, ethyl acrylate, ethyl methacrylate, propyl acrylate, propyl methacrylate, n-, iso- and tert-butyl acrylate, n-, iso- and ter-butyl methacrylate, 2-ethylhexyl acrylate, and norbornyl acrylate. Particularly preferred are methyl acrylate, methyl methacrylate, n-, iso-, and tert-butyl acrylate, 2-ethylhexyl acrylate, and norbornyl acrylate. Examples of dienes are 1,3-butadiene and isoprene. Examples of polymerizable olefins are ethene and propene. As vinyl aromatics, styrene and vinyltoluene may be copolymerized. From the group of the vinyl halides, vinyl chloride, vinylidene chloride or vinyl fluoride, preferably vinyl chloride, are customarily used. The fraction of these comonomers is preferably calculated such that the fraction of vinyl ester monomer in the vinyl ester polymer is >50 mol %.

Optionally it is possible as well for auxiliary monomers to be copolymerized, in a fraction of preferably 0.01 to 20 wt %, based on the total weight of the monomers employed overall. Examples of such auxiliary monomers are ethyenically unsaturated monocarboxylic and dicarboxylic acids, preferably crotonic acid, acrylic acid, methacrylic acid, fumaric acid, and maleic acid; ethyenically unsaturated carboxamides and carbonitriles, preferably N-vinylformamide, acrylamide, and acrylonitrile; monoesters and diesters of fumaric acid and maleic acid, such as the diethyl and diisopropyl esters, and also maleic acid anhydride, ethyenically unsaturated sulfonic acids and their salts, preferably vinylsulfonic acid, 2-acrylamido-2-methyl-propansulfonic acid. Of further suitability as auxiliary monomers are vinyl ethers, vinyl ketones, and further vinylaromatic compounds, which may also possess heteroatoms.

Suitable auxiliary monomers are also polymerizable silanes and mercaptosilanes. Preference is given to γ-acryl- and/or γ-methacryloyloxypropyltri(alkoxy)silanes, α-methacryloyloxymethyltri(alkoxy)silanes, γ-methacryloyloxypropylmethyldi(alkoxy)silanes, vinylalkyldi(alkoxy)silanes, and vinyltri(alkoxy)silanes, where alkoxy groups used may be, for example methoxy, ethoxy, methoxyethylene, ethoxyethylene, methoxypropylene glycol ether and/or ethoxypropylene glycol ether radicals.

With preference, however, no auxiliary monomers are copolymerized, and more particularly no anionic auxiliary monomers, such as ethyenically unsaturated sulfonic acids, ethyenically unsaturated monocarboxylic and dicarboxylic acids, or monoesters of fumaric acid and maleic acid. The preferred nitrogen-functionalized polyvinyl alcohols are therefore not anionic polyelectrolytes, i.e. are not polymers which contain anionic groups and/or monomer units with a negative charge.

Preference is given to copolymerizing vinyl acetate and one or more ethyenically unsaturated monomers which comprise one or more tertiary amine groups or one or more quaternary ammonium groups. In an alternative preferred embodiment it is possible additionally to copolymerize ethylene and/or isopropenyl acetate. The fraction of ethylene and/or isopropenyl acetate is preferably 0 to 15 wt %, more preferably 1 to 15 wt %, and most preferably 2 to 15 wt %, each based on the total weight of the monomers employed overall. The remaining monomers are preferably exclusively vinyl acetate and ethyenically unsaturated monomers which comprise one or more tertiary amine groups or one or more quaternary ammonium groups.

The copolymerization of ethylenically unsaturated monomers which comprise tertiary amine groups or quaternary ammonium groups with vinyl esters and optionally further comonomers and/or optionally auxiliary monomers takes place in general in a mixture of water and one or more alcohols, more particularly one or more monohydric aliphatic alcohols, with a water fraction of 2 to 35 wt %, preferably 4 to 20 wt %. Preferred alcohols are alkanols with $C_1$ to $C_6$ alkyl radicals. Particularly preferred are methanol, ethanol, or isopropanol.

The copolymerization is carried out in general under reflux at a temperature of 40° C. to 100° C. and initiated radically by addition of common initiators. Examples of common initiators are azoinitiators, or percarbonates such as cyclohexyl peroxydicarbonate, or peresters such as tert-butyl perneodecanoate or tert-butyl perpivalate, and also peroxides such as tert-butyl hydroperoxide. The molecular weight can be adjusted in a known way by addition of chain transfer agent, via the solvent content, by varying the initiator concentration, and by varying the temperature. After the end of the polymerization, the solvent and also any excess monomer and chain transfer agent can be removed by distillation.

The hydrolysis of the vinyl ester copolymers takes place in a manner known per se, as for example by the belt process or kneader process, in the alkaline or acidic range, with addition of acid or base. The vinyl ester copolymer is preferably taken up in alcohol, methanol for example, with a solids content of 10 to 80 wt % being set. The hydrolysis is preferably carried out in the basic range, by addition of NaOH, KOH, or $NaOCH_3$, for example. The base is used generally in an amount of 1 to 5 mol % per mole of ester units. The hydrolysis is carried out preferably at temperatures of 25° C. to 80° C. After the end of the hydrolysis, the solvent is preferably removed by distillation and the hydrolyzed vinyl ester copolymer, i.e. the nitrogen-functionalized polyvinyl alcohol, is obtained as a powder. Alternatively the nitrogen-functionalized polyvinyl alcohol may be obtained as an aqueous solution by a successive addition of water while the solvent is being distilled off.

The nitrogen-functionalized polyvinyl alcohols have a degree of hydrolysis of preferably 0.2 to 100 mol %, more preferably 50 to 100 mol %, even more preferably 85 to 100 mol %, and most preferably 90 to 100 mol %. The degree of hydrolysis here denotes the molar ratio of hydrolyzed vinyl ester units relative to the total molar amount of hydrolyzed and unhydrolyzed vinyl ester units in the nitrogen-functionalized polyvinyl alcohols.

The viscosity of the nitrogen-functionalized polyvinyl alcohols is preferably 1 to 40 mPas, more preferably 1 to 20 mPas, and most preferably 2 to 15 mPas (as determined by the Höppler method according to DIN 53015 in a 4% strength solution in water and a temperature of 20° C.).

The nitrogen-functionalized polyvinyl alcohols contain preferably 0.1 to 50 mol %, more preferably 1 to 30 mol %, and most preferably 2 to 20 mol % of monomer units which comprise one or more tertiary amine groups and/or one or more quaternary ammonium groups, each based on the total number of vinyl alcohol units and of the monomer units which comprise one or more tertiary amine groups and/or one or more quaternary ammonium groups, and also, optionally, on the vinyl acetate units of the nitrogen-functionalized polyvinyl alcohols.

The remaining monomer units of the nitrogen-functionalized polyvinyl alcohols are preferably vinyl alcohol units and vinyl ester units, more particularly vinyl alcohol units and vinyl acetate units, and also, optionally isopropenyl acetate units and isopropenyl alcohol units, and optionally ethylene units.

The polymers stabilized with the nitrogen-functionalized polyvinyl alcohols of the invention are also referred to below as base polymers. The base polymers are based generally on one or more monomers selected from the group encompassing vinyl esters of unbranched or branched alkylcarboxylic acids having 1 to 15 C atoms, methacrylic esters and acrylic esters of alcohols having 1 to 15 C atoms, vinylaromatics, olefins, dienes, or vinyl halides. The monomers preferred, more preferred, and most preferred for this purpose are those identified accordingly earlier on above. Furthermore, use may also be made of the above-stated auxiliary monomers, optionally in the above-stated amounts.

Examples of homopolymers and copolymers that are suitable as base polymer are vinyl acetate homopolymers, styrene-acrylic esters copolymers, styrene-1,3-butadiene copolymers, and more particularly copolymers of vinyl acetate with ethylene, copolymers of vinyl acetate with ethylene and one or more further vinyl esters, copolymers of vinyl acetate with ethylene and acrylic ester, and copolymers of vinyl acetate with ethylene and vinyl chloride.

Preference is given to vinyl acetate homopolymers; copolymers of vinyl acetate with 1 to 40 wt % of ethylene; copolymers of vinyl acetate with 1 to 40 wt % of ethylene and 1 to 50 wt % of one or more further comonomers from the group of vinyl esters having 1 to 15 C atoms in the carboxylic acid residue such as vinyl propionate, vinyl dodecanoate, vinyl esters of alpha-branched carboxylic acids having 9 to 13 C atoms such as VeoVa9®, VeoVa10®, VeoVa11®; copolymers of vinyl acetate, 1 to 40 wt % of ethylene, and preferably 1 to 60 wt % of acrylic esters of unbranched or branched alcohols having 1 to 15 C atoms, especially n-butyl acrylate or 2-ethylhexyl acrylate; and copolymers with 30 to 75 wt % of vinyl acetate, 1 to 30 wt % of vinyl laurate or vinyl esters of an alpha-branched carboxylic acid having 9 to 13 C atoms, and also 1 to 30 wt % of acrylic esters of unbranched or branched alcohols having 1 to 15 C atoms, especially n-butyl acrylate or 2-ethylhexyl acrylate, which also comprise 1 to 40 wt % of ethylene; copolymers with vinyl acetate, 1 to 40 wt % of ethylene, and 1 to 60 wt % of vinyl chloride; the polymers may further comprise the stated auxiliary monomers in the stated amounts, and the figures in wt % add up to 100 wt % in each case.

Preference is also given to (meth)acrylic ester polymers, such as copolymers of n-butyl acrylate or 2-ethylhexyl acrylate or copolymers of methyl methacrylate with n-butyl acrylate and/or 2-ethylhexyl acrylate and optionally ethylene; styrene-(meth)acrylic ester copolymers with one or more monomers from the group of methyl acrylate, ethyl acrylate, propyl acrylate, n-butyl acrylate, 2-ethylhexyl acrylate; vinyl acetate-(meth)acrylic ester copolymers with one or more monomers from the group of methyl acrylate, ethyl acrylate, propyl acrylate, n-butyl acrylate, 2-ethylhexyl acrylate, and optionally ethylene; styrene-1,3-butadiene copolymers; the polymers may further comprise the stated auxiliary monomers in the stated amounts, and the figures in wt % add up to 100 wt % in each case.

The base polymers are preferably not cationic, especially not anionic, and more preferably nonionic. The base polymers therefore preferably contain no monomer units with a cationic or anionic charge. The base polymers, accordingly, are generally not polyelectrolytes.

The monomer selection and the selection of the weight fractions of the comonomers are made such that in general the resulting glass transition temperature, Tg, is from −40° C. to +30° C., preferably −40° C. to +25° C., and more preferably −20° C. to +10° C. The glass transition temperature Tg of the polymers can be determined in a known way by means of Differential Scanning calorimetry (DSC). The Tg may also be calculated approximately in advance by means of the Fox equation. According to Fox T. G., Bull. Am. Physics Soc. 1, 3, page 123 (1956), the following holds: $1/Tg = x1/Tg1 + x2/Tg2 + \ldots + xn/Tgn$, where xn stands for the mass fraction (wt %/100) of the monomer n, and Tgn is the glass transition temperature in kelvins of the homopolymer of the monomer n. Tg values for homopolymers are listed in Polymer Handbook 2nd Edition, J. Wiley & Sons, New York (1975).

The homopolymers and copolymers are prepared preferably by the emulsion polymerization process, in which case the polymerization temperature is generally, but not necessarily <100° C. Independently of the polymerization process, the polymerization may be carried out with or without the use of seed lattices, with initial charging of all or individual constituents of the reaction mixture, or with partial initial charging and subsequent metering of the constituents or of individual constituents of the reaction mixture, or by the metering method without an initial charge. The comonomers for the preparation of a dispersion may also be included in the initial charge (batch process) or a portion of the monomers is included in the initial charge and the remainder is metered in (semibatch process).

The polymerization is initiated with the water-soluble initiators or redox initiator combinations that are commonplace for emulsion polymerization. Examples of water-soluble initiators are the sodium, potassium, and ammonium salts of peroxodisulfuric acid, hydrogen peroxide, tert-butyl peroxide, tert-butyl hydroperoxide, potassium peroxodisphosphate, tert-butyl peroxopivalate, cumene hydroperoxide, isopropylbenzene monohydroperoxide, and azobisisobutyronitrile. The stated initiators are used generally in an amount of 0.001 to 2 wt %, preferably 0.1 to 0.5 wt %, based in each case on the total weight of the monomers. Redox initiators used are combinations of the stated initiators in combination with reducing agents. Suitable reducing agents are the sulfites and bisulfites of the alkali metals and of ammonium, an example being sodium sulfite, the derivates of sulfoxylic acid such as zinc or alkali metal formaldehydesulfoxylates, an example being sodium hydroxymethanesulfinate, and ascorbic acid. The amount of reducing agent is generally 0.001 to 1 wt %, preferably 0.1 to 0.5 wt %, based in each case on the total weight of the monomers.

The polymerization may take place in the presence of one or more nitrogen-functionalized polyvinyl alcohols of the invention and/or one or more other protective colloids, such as, for example, polyvinyl alcohols, polyvinyl acetals, polyvinylpyrrolidones, polysaccharides in water-soluble form, such as starches (amylose and amylopectin), celluloses and their methyl, hydroxyethyl and/or hydroxypropyl derivatives, and poly(meth)acrylamide. The aforementioned other protective colloids are preferably nonionic and more preferably are not substituted by an amine group or ammonium group. Polyvinyl alcohols are preferred as other protective colloids, and preferably have the viscosities referred to above for the nitrogen-functionalized polyvinyl alcohols. The polyvinyl alcohols may be fully hydrolyzed or, preferably, partly hydrolyzed. Fully hydrolyzed polyvinyl alcohols have a degree of hydrolysis of preferably >96 mol % and more preferably of 97 to 99.9 mol %. Partially hydrolyzed polyvinyl alcohols have a degree of hydrolysis >50 mol % and ≤96 mol %, more preferably 70 mol % to 96 mol %, and most preferably from 80 mol % to 94 mol %.

In the polymerization for preparing the base polymers, use is made generally of 1 to 20 wt %, preferably 5 to 15 wt %, and most preferably 5 to 10 wt % of nitrogen-functionalized polyvinyl alcohols and/or other protective colloids, based on the total weight of the base polymers.

Alternatively the polymerization may also be carried out in the presence of emulsifiers or in the presence of the stated protective colloids in combination with emulsifiers. Preferred in this context are nonionic emulsifiers. Examples of nonionic emulsifiers are surfactants such as alkyl polyglycol ethers or alkylaryl polyglycol ethers having 8 to 40 alkylene oxide units. Preferred are alkoxylated $C_8$ to $C_{16}$ alcanols alkoxylated with $C_2$ to $C_4$ alkylene oxides, more particularly ethylene oxide and propylene oxide or mixtures thereof. In the polymerization, the emulsifiers are added generally in an amount of 0.05 to 10 wt %, based on the total weight of the monomers.

The aqueous dispersions of the base polymers have a solids content of preferably 30 to 75 wt %, more preferably 50 to 60 wt %.

For the preparation of the polymer powders redispersible in water, the aqueous dispersions, following addition of one or more nitrogen-functionalized polyvinyl alcohols of the invention and/or one or more further protective colloids, such as the above-stated other protective colloids, as a drying aid, can be dried.

The nitrogen-functionalized polyvinyl alcohols of the invention may be added, preferably as a drying aid, before, during, or after the drying to base polymer dispersions. As drying aid, besides the nitrogen-functionalized polyvinyl alcohols of the invention, no further protective colloids are preferably added. With particular preference the nitrogen-functionalized polyvinyl alcohols of the invention are not used before or during the polymerization for the preparation of the base polymers.

Drying takes place for example by means of fluid-bed drying, freeze drying or spray drying. The dispersions of the base polymers are preferably spray-dried. This spray drying takes place in customary spray-drying units, in which atomization may take place by means of one-fluid, two-fluid, or multi-fluid nozzles or by a rotating disk. The exit temperature selected is generally in the range from 45° C. to 120° C., preferably 60° C. to 90° C., depending on the unit and the desired degree of drying.

Generally speaking, nitrogen-functionalized polyvinyl alcohols of the invention are used, optionally in combination with further protective colloids, in an amount of in total 2 to 30 wt %, preferably 2 to 20 wt %, more preferably 3 to 15 wt %. Where particular value is placed on the rheology of the mineral building material compositions, the aforementioned amounts for use are preferably 2 to 30 wt %, more preferably 2 to 20 wt %, and most preferably 5 to 15 wt %. If attention is being paid to the adhesion of the mineral building material compositions to substrates, the aforementioned amounts for use are preferably 2 to 10 and more preferably 3 to 7 wt %. The above figures in wt % are based in each case on the polymer constituents of the polymer powders.

Having been found favorable in many cases at the drying stage is the presence of up 2 wt % of antifoam agent, based on the base polymer. In order to prolong the shelf life by improving the blocking stability, especially in the case of powders with a low glass transition temperature, the powder obtained may be equipped with an antiblocking agent (anticaking agent), preferably up to 30 wt %, based on the total weight of polymeric constituents. Examples of antiblocking agents are Ca and/or Mg carbonate, talc, gypsum, silica, kaolins, metakaolins, and silicates with particle sizes preferably in the range from 10 nm to 100 µm.

The viscosity of the mixture to be atomized and to be dried is adjusted via the solids content in such a way as to give a figure of <1000 mPas (Brookfield viscosity at 20 revolutions and 23° C.), preferably <500 mPas, more preferably <250 mPas. The solids content of the mixture to be atomized ought to be >30 wt %, preferably >40 wt %.

In order to improve the performance properties, it is possible for further additions to be made before or during or after drying. Further constituents of dispersion powder compositions that are present in preferred embodiments are, for example, foam stabilizers, hydrophobizing agents, or plasticizers.

The mineral building material compositions generally comprise one or more of mineral binders, more particularly one or more hydraulically setting binders, one or more polymers stabilized with nitrogen-functionalized polyvinyl alcohol, preferably one or more fillers, and optionally one or more additives.

Examples of hydraulically setting binders are cement, such as Portland, aluminate, trass, blast furnace, magnesia, and phosphate cement, gypsum or else waterglass, lime hydrate, metakaolin, flyash, diatomaceous earth, or amorphous silica.

Fillers which can be used are, for example, finely ground limestone, clay, talc, or, preferably, the common silica sands or carbonates, such as calcium carbonates. Customary particle sizes of the fillers are 0.5 to 5.0 mm, preferably 1.0 to 3.0 mm.

Typical formulas of the mineral building material compositions comprise in general 1 to 50 wt %, more particularly 2 to 45 wt %, of mineral binders, 0.5 to 40 wt %, preferably 1 to 30 wt %, more preferably 1 to 10 wt %, of stabilized polymers of the invention, 45 to 80 wt %, preferably 50 to 70 wt %, of fillers, and optionally 0 to 5 wt %, more particularly 0.1 to 3 wt %, of additives. In the case of construction adhesives, more particularly tile adhesives, use is made preferably of 1 to 5 wt % of polymers stabilized in accordance with the invention. In grouts the use of 15 to 40 wt % of polymers stabilized in accordance with the invention is preferred. The above figures in wt % are based on the dry weight of the mineral building material compositions, and add up in total to 100 wt %.

The mineral building material compositions are present preferably in the form of dry mixtures. Generally speaking, the mineral building material compositions are converted into aqueous building material compositions by addition of water prior to their application, more particularly directly prior to their application.

In order to improve the processing properties, the mineral building material compositions may be admixed with additives. Customary additives are thickeners, examples being polysaccharides such as cellulose ethers and modified cellulose ethers, starch ethers, guar gum, xanthan gum, polycarboxylic acids such as polyacrylic acid and the partial esters thereof, and also polyvinyl alcohols, such may optionally have been acetalized or hydrophobically modified, casein and associative thickeners. Other customary additives are setting accelerators, examples being alkali metal salts or alkaline earth metal salts of organic or inorganic acids. In addition, the following may be mentioned: hydrophobizing agents, film-forming assistants, dispersants, foam stabilizers, defoamers, plasticizers, and flow agents.

The mineral building material compositions are suitable, for example, as construction adhesives, more particularly tile adhesives (for example, high-flex adhesives) or adhesives for exterior insulation and finishing systems, renders, filling compounds, such as floor filling compounds, leveling compounds, grouts, jointing mortars, or for concrete modification, such as for spray-applied concrete, for example. Preferred areas of application are grouts and tile adhesives, including in particular tile adhesives for wood substrates.

With the procedure according to the invention, surprisingly, mineral building material compositions are obtained which have advantageous processing properties, especially the desired open time. In accordance with the invention, moreover, low-odor mineral building material compositions are also obtainable. The polymers stabilized in accordance with the invention are also obtainable inexpensively in accordance with the established processes.

The examples which follow serve for further elucidation of the invention:

Cationic Protective Colloids (PC):

PC-1:

The cationic polyvinyl alcohol was prepared by polymerizing 95 parts by weight of vinyl acetate and 5 parts by weight (2.7 mol %) of diallyldimethylammonium chloride (DADMAC) in analogy to example 1 of US2006/0264572, with subsequent hydrolysis as described in the general operational protocol of US2006/0264572.

The cationic polyvinyl alcohol had a degree of hydrolysis of 99 mol % and also a Höppler viscosity of 5.1 mPas. The degree of hydrolysis here, as for the subsequent cationic protective colloids as well, pertains to the ratio of hydrolyzed vinyl acetate units to the total number of unhydrolyzed and hydrolyzed vinyl acetate units.

PC-2:

Analogously to PC-1, with a difference that the polymerization used 90 parts by weight of vinyl acetate and 10 parts by weight (5.5 mol %) of DADMAC and PC-2 had a degree of hydrolysis of 97 mol % and a Höppler viscosity of 4.2 mPas.

PC-3:

Analogously to PC-1, with a difference that the polymerization used 82 parts by weight of vinyl acetate and 18 parts by weight (10.5 mol %) of DADMAC and PC-3 had a degree of hydrolysis of 80 mol % and a Höppler viscosity of 3.3 mPas.

PC-4:

Analogously to PC-1, with a difference that the polymerization used 75 parts by weight of vinyl acetate and 25 parts by weight (15 mol %) of DADMAC and PC-4 had a degree of hydrolysis of 80 mol % and a Höppler viscosity of 3 mPas.

CEPC-5:

Nonionic polyvinyl alcohol Mowiol M04/88 (trade name of Kuraray) with a degree of hydrolysis of 88% and a Höppler viscosity of 4 mPas.

CEPC-6:

Catiofast CS (trade name of BASF): polymer of DADMAC.

CEPC-7:

An amine-functional polyvinyl alcohol was prepared with 5 mol % of allylamine in accordance with EP 0632 096 A1 and with a degree of hydrolysis of 98 mol %. The Höppler viscosity was 4.3 mPa·s.

Polymer Dispersion:

Aqueous vinyl acetate-ethylene polymer dispersion with a glass transition temperature Tg of −7° C. and a solids content of 50 wt %, comprising 7 wt %, based on the solids content, of polyvinyl alcohol with a degree of hydrolysis of 88 mol % and a Höppler viscosity of 4 mPa·s.

The Höppler viscosities of the protective colloids and of polymer dispersions was determined in each case according to DIN 53015 in 4% strength aqueous solution at 20° C.

Preparation of the Redispersible Powders (DPP):

In order to prepare polymer powders redispersible in water (DPP), the aqueous ethylene-vinyl acetate polymer dispersions with 7 wt % protective colloids, in accordance with the details in the table, were used as a drying aid, based on the polymeric constituents of the dispersion powders, and were sprayed using a two-fluid nozzle. The nozzle spraying was carried out with 4 bar compressed air, and the droplets formed were dried cocurrently with air heated at 125° C. The dry polymer powder was admixed with 3 wt % of commercial antiblocking agent (kaolin).

Production of Mineral Building Material Compositions:

The ingredients of the following formula were mixed at room temperature to give cementitious grouts:

| | |
|---|---|
| Silica sand | 665 parts |
| Portland cement | 50 parts |
| Cellulose | 5 parts |
| DPP | 280 parts |
| Water | 400 parts |

Determination of the Processing Properties (PP) of the Mineral Building Material Compositions:

The processing properties were estimated during the mixing of the dry components with water. The processing properties of the grouts were classified as follows:
1=very good, smooth processability, no trowel adhesion;
2=somewhat difficult processability, slight trowel adhesion;
3=inadequate processability, viscous and sticky.

Assessment of the Odor of the Mineral Building Material Compositions

For the assessment of the odor, the respective grout was tested by nasal sampling 15 minutes after having been mixed with water. The testers evaluated the odor using school grades from 1 to 5, where 1 stands for very good or odorless and 5 for poor or intense odor, and the ratings represent a continuous scale.

TABLE

| Polymer powder | PC | Odor rating | PP |
|---|---|---|---|
| DPP-1 | PC-1 | 2 | 2 |
| DPP-2 | PC-2 | 2 | 1 |
| DPP-3 | PC-3 | 3 | 1 |
| CDPP-1 | PC-4 | 4 | 1 |
| CDPP-2 | CEPC-5 | 1 | 3 |
| CDPP-3 | CEPC-6 | 5 | 1 |
| CDPP-7 | CEPC-7 | 3 | 3 |

The invention claimed is:

1. In a mineral building composition comprising at least one mineral binder and protective-stabilized polymer, the improvement comprising employing, as at least one protective colloid, a polyvinyl alcohol comprising at least one tertiary amine group or quaternary ammonium group.

2. The mineral building composition of claim 1, wherein the polyvinyl alcohols which comprise at least one tertiary amine group or quaternary ammonium group are obtained by copolymerizing one or more ethylenically unsaturated monomers which comprise one or more tertiary amine groups or one or more quaternary ammonium groups with one or more vinyl esters of unbranched or branched carboxylic acids having 1 to 15 C atoms to form vinyl ester copolymers, and hydrolyzing the vinyl ester copolymers.

3. The mineral building composition of claim 2, wherein the ethylenically unsaturated monomers which comprise at least one tertiary amine group or quaternary ammonium group are selected from the group consisting of allylalkylammonium halides, (meth)acryloyloxyalkylammonium halides, (meth)acrylamidoalkylammonium halides, aminoalkyl(meth)acrylate and aminoalkyl(meth)acrylamide in which the alkyl radicals may contain 1 to 20 C atoms, nitrogen atom-containing, optionally substituted heteroaromatics which carry vinyl groups, and mixtures thereof.

4. The mineral building composition of claim 3, wherein the ethylenically unsaturated monomers which comprise at least one tertiary amine group or quaternary ammonium group are selected from the group consisting of 2-dimethylaminoethyl methacrylate and 3-dimethylaminopropylmethacrylamide, N-(1,1-dimethyl-3-dimethylaminopropyl)acrylamide, N-(1,1-dimethyl-3-dimethylaminobutyl)acrylamide, N-(1-methyl-1,3-diphenyl-3-diethylaminopropyl)methacrylamide, 1-vinylimidazole, 1-vinyl-2-methylimidazole, 1-vinyl-2-ethylimidazole, 1-vinyl-2-phenylimidazole, 1-vinyl-2,3-dimethylimidazole, and 1-vinyl-2,4,5-trimethylimidazole, diallyldiethylammonium chloride, (3-methacryloyloxy)propyltrimethylammonium chloride, (3-methacryloyloxy)ethyltrimethylammonium chloride, (3-methacrylamido)propyltrimethylammonium chloride, trimethyl-3-(1-acrylamido-1,1-dimethylpropyl) ammonium chloride, trimethyl-3-(1-acrylamido-1,1-dimethylbutyl) ammonium chloride, dimethylacrylamidopropyl-4-trimethylammoniobuten-2-ylammonium chloride, (2-acrylamidomethoxy)ethyltrimethylammonium chloride, diallyldimethylammonium chloride, and mixtures thereof.

5. The mineral building composition of claim 2, wherein the nitrogen-functionalized polyvinyl alcohols comprise 0.1 to 50 mol % of monomer units which comprise at least one tertiary amine group and/or quaternary ammonium group, each based on the total number of vinyl alcohol units, monomer units which comprise tertiary amine groups and/or quaternary ammonium groups, and vinyl acetate units of the nitrogen-functionalized polyvinyl alcohols.

6. The mineral building composition of claim 1, wherein the polyvinyl alcohols which comprise at least one tertiary amine group or quaternary ammonium group have a degree of hydrolysis of 0.2 to 100 mol %.

7. The mineral building composition of claim 1, wherein the polymers stabilized with polyvinyl alcohol are based on one or more monomers selected from the group consisting of vinyl esters of unbranched or branched alkylcarboxylic acids having 1 to 15 C atoms, methacrylic esters or acrylic esters of alcohols having 1 to 15 C atoms, vinylaromatics, olefins, dienes, and vinyl halides.

8. The mineral building composition of claim 1, wherein the mineral building material compositions comprise 1 to 50 wt. % of mineral binders, 0.5 to 40 wt. % of polyvinyl alcohol-stabilized polymers stabilized with one or more polyvinyl alcohols comprising at least one tertiary amine group or quaternary ammonium group, 45 to 80 wt. % of fillers, and optionally 0 to 5 wt. % of additives, the amounts in wt. % being based on the dry weight of the mineral building material compositions and adding up in total to 100 wt. %.

9. The mineral building composition of claim 1, wherein the mineral building material compositions are selected from the group consisting of construction adhesives, renders, filling compounds, leveling compounds, grouts, jointing mortars, and concrete modifiers.

* * * * *